(12) United States Patent
Nakazawa et al.

(10) Patent No.: US 12,514,275 B2
(45) Date of Patent: Jan. 6, 2026

(54) PRODUCTION METHOD FOR SOLUBLE MATERIAL

(71) Applicant: ZENSHO HOLDINGS CO., LTD., Tokyo (JP)

(72) Inventors: Hidetsugu Nakazawa, Tokyo (JP); Hidemi Wakasa, Tokyo (JP); Kinzo Iitani, Tokyo (JP); Koichi Yoshimura, Tokyo (JP)

(73) Assignee: Zensho Holdings Co., Ltd., Tokyo (JP)

( * ) Notice: Subject to any disclaimer, the term of this patent is extended or adjusted under 35 U.S.C. 154(b) by 237 days.

(21) Appl. No.: 18/027,206

(22) PCT Filed: Jun. 23, 2021

(86) PCT No.: PCT/JP2021/023809
§ 371 (c)(1),
(2) Date: Mar. 20, 2023

(87) PCT Pub. No.: WO2022/079949
PCT Pub. Date: Apr. 21, 2022

(65) Prior Publication Data
US 2023/0329300 A1    Oct. 19, 2023

(30) Foreign Application Priority Data
Oct. 13, 2020 (JP) .................. 2020-172490

(51) Int. Cl.
*A23L 27/50* (2016.01)
*A23B 2/10* (2025.01)
(Continued)

(52) U.S. Cl.
CPC .............. *A23L 27/50* (2016.08); *A23B 2/103* (2025.01); *A23B 2/42* (2025.01); *A23L 11/07* (2016.08); *A23P 30/20* (2016.08)

(58) Field of Classification Search
CPC .......... A23L 27/50; A23L 11/07; A23P 30/20; A23B 2/103; A23B 2/42
(Continued)

(56) References Cited

FOREIGN PATENT DOCUMENTS

| CN | 1593242 A | 3/2005 |
|---|---|---|
| CN | 1718098 A | 1/2006 |

(Continued)

OTHER PUBLICATIONS

Translation of JP-61247353-A (Year: 1986).*
Wei Zhong, "New technology in food industry," Northeast Forestry University Press, 242 (2006).
Liu Su, "Practical new technologies for food processing (4)," China Food Press, 304-305 (1989).
(Continued)

*Primary Examiner* — Brent T O'Hern
(74) *Attorney, Agent, or Firm* — Morgan, Lewis & Bockius LLP

(57) ABSTRACT

Provided is a production method for a soluble material, including: causing a solid raw material containing at least one component of a hydrolyzable material selected from the group consisting of a protein, a carbohydrate and a lipid, and a fibrous material, and water in an amount corresponding to 0.04 to 2.4 parts by weight with respect to 1 part by weight of a dry amount of the raw material to coexist; applying a shearing force in a state where heating and pressurization are performed at 200 to 374° C. and in a pressure range equal to or higher than a vapor-liquid coexistence curve of water to hydrolyze at least a part of the hydrolyzable material and/or to amorphize at least a part of the fibrous material; and halting the pressurization to cause adiabatic expansion.

19 Claims, 1 Drawing Sheet

(51) Int. Cl.
*A23B 2/42* (2025.01)
*A23L 11/00* (2021.01)
*A23P 30/20* (2016.01)

(58) Field of Classification Search
USPC .......................................................... 426/634
See application file for complete search history.

(56) References Cited

FOREIGN PATENT DOCUMENTS

| | | | |
|---|---|---|---|
| CN | 107927709 A | | 4/2018 |
| CN | 109265574 A | | 1/2019 |
| JP | 61247353 A | * | 11/1986 |
| JP | S61-247353 A | | 11/1986 |
| JP | S61-260853 A | | 11/1986 |
| JP | S62-055050 A | | 3/1987 |
| JP | S63-286401 A | | 11/1988 |
| JP | H02-057160 A | | 2/1990 |
| JP | H02-312570 A | | 12/1990 |
| JP | H07-051022 A | | 2/1995 |
| JP | H09-268166 A | | 10/1997 |
| JP | 2000-041620 A | | 2/2000 |
| JP | 2003-079240 A | | 3/2003 |
| JP | 2005-021131 A | | 1/2005 |
| JP | 2005-120004 A | | 5/2005 |
| JP | 2006-204265 A | | 8/2006 |
| WO | 02/076226 A1 | | 10/2002 |
| WO | 2004/039936 A1 | | 5/2004 |
| WO | 2007/077954 A1 | | 7/2007 |

OTHER PUBLICATIONS

Sheng Guohua, "The application of undercritical fluid extract technology in food scraps extraction," China Food Additives, 6: 127-129 (Nov. 28, 2008).

Yuan Zhenyuan, "Ways to improve total nitrogen utilization of soy sauce raw materials," Food Teaching and Research Group of South China Institute of Technology, 2-8 (Dec. 10, 1983).

Chen Jusheng Editor-in-chief Ding Xianzheng Editor, "National "Spark Program" Series Production Technology of Soybean Products", Chemical Industry Press Printing House, 20-21 (Sep. 30, 1993).

Yoichi Kawasaki, "New Foods of Soy-Bean Protein Development of New Material by Twin Screw Cooking Extruder", Food Processing and Ingredients, 23 (1): 47-50 (1988) (see partial English translation).

International Search Report issued in corresponding International Patent Application No. PCT/JP2021/023809 dated Jul. 20, 2021.

International Preliminary Report on Patentability and Written Opinion issued in corresponding International Patent Application No. PCT/JP2021/023809 dated Apr. 27, 2023.

Guan Qingqing, Ning Ping, Gu Junjie et al, "Sub-/supercritical water technology and principle", Metallurgical Industry Press, 2014.

Office Action issued in Chinese Patent Application No. 202180051763.7 dated Dec. 6, 2024.

Office Action issued in counterpart European Patent Application No. 21879693.6 dated Jun. 3, 2025.

* cited by examiner

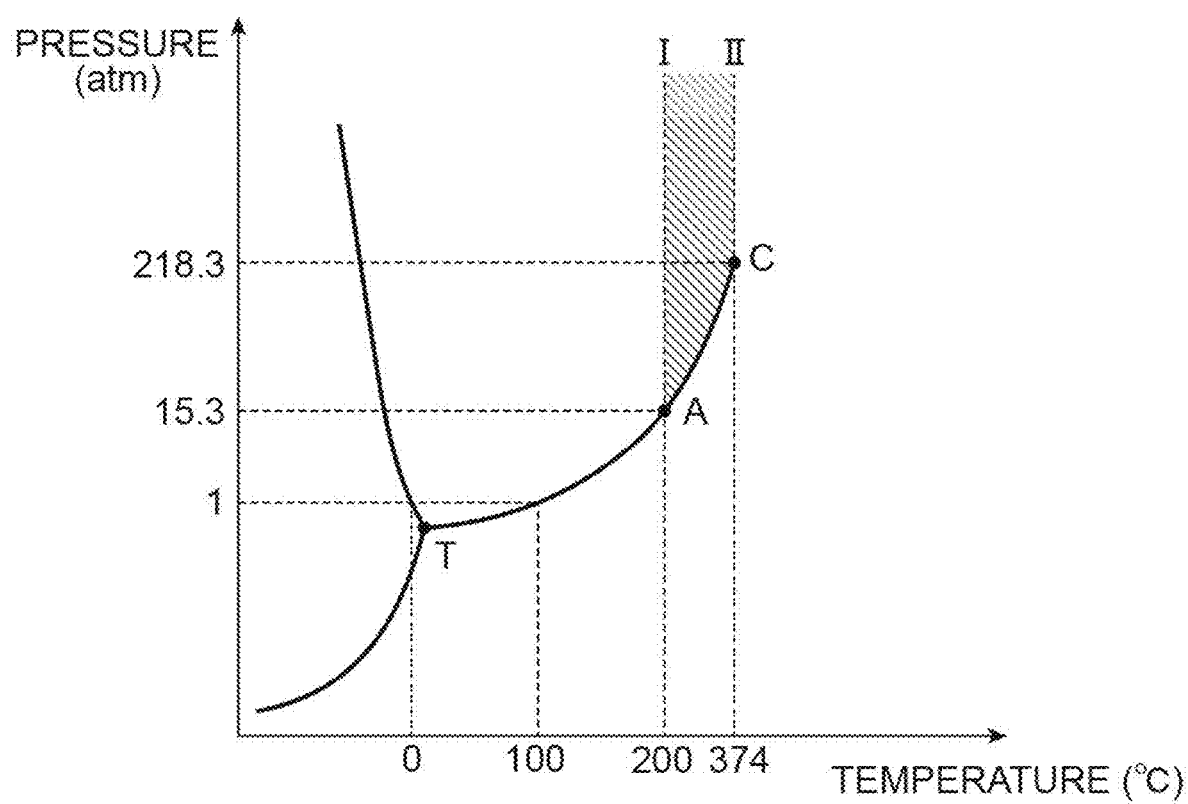

PRODUCTION METHOD FOR SOLUBLE MATERIAL

TECHNICAL FIELD

The present invention relates to a production method for a soluble material.

BACKGROUND ART

In food products, in addition to cases where raw food materials are used, there are many cases where food materials are subjected to heating or the like to decompose or modify contained components and then are used for production raw materials. A typical example of the latter cases is a soy sauce, and the soy sauce is generally produced by heat-treating soybean and wheat to produce koji, adding salt water thereto to obtain moromi mash, pressing the moromi mash after fermentation and aging, and then performing pasteurization (Patent Literature 1).

In order to heat-treat a food material, a batch type heating and pressurization container is generally used, but when a heating treatment is intended to be performed at practical level, the size of the container increases, it takes a long time to perform charging, processing, ejection, and the like of the food material, and excessive energy is also consumed in order to perform uniform heating.

In this regard, it has been proposed that a heating treatment is continuously performed using an extruder. For example, Patent Literature 2 describes a raw material for a soy sauce production obtained by treating pressed whole soybeans using a twin-screw extruder (biaxial extruder) at an initial temperature of 170 to 190° C., a predetermined added water rate, shaft power energy, or the like.

According to this method, although a steaming step can be omitted, a problem arises in that contamination of general viable bacteria is increased (Patent Literature 3, [0008]), and in order to solve this problem, it has been proposed that a predetermined amount of water is added to cracked whole soybeans, a heating treatment is performed at 70 to 130° C. for 30 to 120 minutes, and then a raw material for a soy sauce production is obtained with a one-screw extruder (uniaxial extruder) under the conditions of an initial temperature of 130 to 190° C., and the like (Patent Literature 3).

According to this method, the problem of Patent Literature 1 is solved, but it has been pointed out that a steaming treatment, which is not required in Patent Literature 1, is necessary (Patent Literature 3, [0011]).

Meanwhile, a treatment method for a food component using supercritical water or subcritical water has also been reported, and for example, Patent Literature 4 describes that hydrolyzation is performed using water in a supercritical state or a subcritical state in a method for producing an amino acid by hydrolyzing a protein.

CITATION LIST

Patent Literature

Patent Literature 1: Japanese Unexamined Patent Publication No. 2005-21131
Patent Literature 2: Japanese Unexamined Patent Publication No. H7-51022
Patent Literature 3: Japanese Unexamined Patent Publication No. 2000-41620
Patent Literature 4: Japanese Unexamined Patent Publication No. H9-268166
Patent Literature 5: Japanese Unexamined Patent Publication No. 2005-120004

SUMMARY OF INVENTION

Technical Problem

As is apparent from the descriptions of Patent Literatures 2 and 3, for a conventional processing of soybeans using an extruder, problems such as necessity of steaming treatment and insufficient sterilization still remain.

Furthermore, in Patent Literature 4, the reaction method may be either a continuous type or a batch type ([0027]), but there is only a test in a batch type ([0033]), and a material to be used is also only zein that is a protein extracted from corn with alcohol ([0033]). Further, the amount of water used in Patent Literature 4 is usually 3 to 100 parts by weight with respect to 1 part by weight of the protein ([0024]), and it is assumed that hydrolyzation is performed using an excessive amount of water with respect to the stoichiometric amount. Furthermore, it has not been studied that a raw material composed of a plurality of components is continuously treated in a supercritical or subcritical state.

An object of the present invention is to provide a production method for a soluble material which can be executed without using a large-sized batch type apparatus and can perform sufficient sterilization, and in which the soluble material can be directly used as a soluble food material or the like for production of a food product.

Solution to Problem

The present invention provides a production method for a soluble material, including: causing a solid raw material containing at least one component of a hydrolyzable material selected from the group consisting of a protein, a carbohydrate and a lipid, and a fibrous material, and water in an amount corresponding to 0.04 to 2.4 parts by weight with respect to 1 part by weight of a dry amount of the raw material to coexist; applying a shearing force in a state where heat at 200° C. or higher and a pressure of more than 1 atmosphere are applied to hydrolyze at least a part of the hydrolyzable material and/or to amorphize at least a part of the fibrous material; and halting the pressurization to cause adiabatic expansion.

Note that, as a preferred aspect of the present invention, the following aspect is included. That is, included is a production method for a soluble material, including: causing a solid raw material containing at least one component of a hydrolyzable material selected from the group consisting of a protein, a carbohydrate and a lipid, and a fibrous material, and water in an amount corresponding to 0.04 to 2.4 parts by weight with respect to 1 part by weight of a dry amount of the raw material to coexist (so that an amount of the water including water originally contained in the raw material reaches 0.04 to 2.4 parts by weight); applying a shearing force in a state where heating and pressurization are performed at 200 to 374° C. and in a pressure range equal to or higher than a vapor-liquid coexistence curve of water to hydrolyze at least a part of the hydrolyzable material and/or to amorphize at least a part of the fibrous material; and halting the pressurization to cause adiabatic expansion.

This production method can be executed by an extruder or the like as described below including the preferred aspect described above, and it is not necessary to use a large-sized batch type apparatus (note that, this is not intended to forbid use of a batch type apparatus). Furthermore, since the heating temperature is as high as 200° C. or higher and processing is performed while a shearing force is applied at a high pressure, sufficient heat, pressure, and shearing force are applied to the raw material during processing, so that sufficient sterilization is possible and a soluble material, which can be directly used as a soluble food material or the like for production of a food product, can be obtained.

In the present invention, since heating is performed at a temperature higher than 190° C. that is the upper limit of the heating temperature in Patent Literatures 2 and 3, and the treatment is performed at a pressure of more than 1 atmosphere (preferably, a pressure equal to or higher than a vapor-liquid coexistence curve of water), at least a part of the hydrolyzable material is hydrolyzed, and at least a part of crystalline cellulose constituting a fibrous material is amorphized and solubilized. Furthermore, since the heating and pressurization are executed under such conditions, sterilization of a soluble material to be obtained becomes sufficient.

In the present invention, unlike Patent Literature 4, water to be added is based on the dry amount of the raw material, and calculation is performed also including water contained in the raw material itself. Furthermore, the total weight thereof is also largely different from the amount in Patent Literature 4. That is, in the present invention, the heating and pressurization are executed in a state where the raw material and water in an amount corresponding to 0.04 to 2.4 parts by weight with respect to 1 part by weight of the dry amount of the raw material are caused to coexist. When the amount thereof is less than the lower limit value, sufficient hydrolyzation does not proceed, and when the amount thereof exceeds the upper limit value, excessive water may remain after adiabatic expansion, and the temperature may not be sufficiently decreased when the raw material is ejected from the apparatus in some cases.

It is preferable that the heating is performed at 200 to 374° C. and the pressurization is performed at 16 to 218 atmospheres. It is known that the critical temperature of water is 374° C. and the critical pressure is 22.1 MPa (218.3 atmospheres=218.3 atm), and the states of the critical temperature and the critical pressure are called critical points. In general, supercritical water refers to water in a state where the temperature and the pressure are higher than the critical temperature and the critical pressure, respectively (https://www.mext.go.jp/b_menu/shingi/gijyutu/gijyutu0/shiryo/attach/1 331584.htm, hereinafter, this is called "Site of Ministry of Education, Culture, Sports, Science and Technology" in some cases), water having a temperature equal to or lower than the critical temperature and a pressure equal to or higher than a saturated vapor pressure of water is called subcritical water in some cases. Although there are various theories as to the definition of the subcritical water, in the present specification, water having a temperature equal to or lower than the critical temperature and a pressure equal to or higher than the saturated vapor pressure of water (excluding a critical point) is called subcritical water and water at a critical temperature and a critical pressure is called water at a critical point.

The heating and pressurization conditions above overlap with conditions in which subcritical water or water at a critical point is generated. Therefore, in the present invention, hydrolyzation of the hydrolyzable material and amorphization of cellulose in the absence of a catalyst or the like easily occur by action of only water without a catalyst or the like, and a soluble material that can be applied to various use applications can be obtained in a short time.

Note that, although Patent Literature 5 discloses that a hydrolyzable compound is handled in water in a supercritical state or a subcritical state, this is content that a condensable material such as amino acid is subjected to dehydration condensation to increase molecular weight (synthesize a hydrolyzable compound), and the reaction direction is reverse to that of the present invention.

The method of the present invention can be executed by an extruder. That is, the heating and pressurization can be performed inside an extruder, and the adiabatic expansion can be executed by ejection from a discharge port of the extruder. By using the extruder, the raw material can be subjected to heating and pressurization in a small space and a shearing force can be applied to the raw material, which is suitable for execution of the present invention. In particular, since a biaxial extruder can efficiently apply a shearing force, the processing time of the raw material can be shortened, which is preferable.

As the raw material, at least one selected from the group consisting of a food material, a feed, and a factory residue (a mill residue) generated by processing of these food material and feed can be adopted, and examples of preferable food materials include those containing a fibrous material (such as grain, tuber crops, factory residues generated by processing of these grain and tuber crops).

The present invention also provides a soluble material obtainable by the above-described production method. The form of the soluble material is not limited, and for example, in the case of using a material containing a fibrous material as the raw material, a soluble material to be obtained may be in the form of a swollen product. Furthermore, in the case of using a material not containing a fibrous material as the raw material, a soluble material to be obtained may be in the form of a granulated product.

In the case of using soybean and/or wheat as the raw material, it is possible to provide a production method for a soy sauce, including a step of performing koji production with respect to a soluble material obtainable by the above-described method. By executing this production method, a soy sauce with excellent taste and robust flavor can be obtained.

As a further aspect of the present invention, there are included a production method for a soluble material by which a soluble material with an improved solubilization ratio can be efficiently produced without using a complicated or special production apparatus and an improvement method for a solubilization ratio by adopting this production method.

That is, provided is a method for producing a soluble material from a solid raw material containing at least one component of a hydrolyzable material selected from the group consisting of a protein, a carbohydrate, and a lipid and a fibrous material, the production method including a step of causing the raw material and water in an amount corresponding to 0.04 to 2.4 parts by weight with respect to 1 part by weight of a dry amount of the raw material to coexist, applying a shearing force in a state where heating and pressurization are performed to hydrolyze at least a part of the hydrolyzable material and/or to amorphize at least a part of the fibrous material, and halting the pressurization to cause adiabatic expansion, in which the heating and pressurization are executed at a temperature T selected from a range of 300 to 374° C. and a pressure P, and the pressure P is equal to or higher than a saturated vapor pressure of water at the temperature T and equal to or lower than the saturated vapor pressure+50 atmospheres. Note that, in a phase diagram of water, the saturated vapor pressure is represented as a vapor-liquid coexistence curve of water.

This production method can be executed by an extruder or the like, and since water in a supercritical state is not used, a complicated or special production apparatus is not necessary, and thus a design problem in the production apparatus and a problem of excessive energy do not arise.

As a further aspect of the present invention, the following method is included. That is, provided is an improvement method for a solubilization ratio of a soluble material obtained from a solid raw material containing at least one component of a hydrolyzable material selected from the group consisting of a protein, a carbohydrate and a lipid, and a fibrous material, in which the soluble material is obtained by causing the raw material and water in an amount corresponding to 0.04 to 2.4 parts by weight with respect to 1 part by weight of a dry amount of the raw material to coexist, applying a shearing force in a state where heating and pressurization are performed to hydrolyze at least a part of the hydrolyzable material and/or to amorphize at least a part of the fibrous material, and halting the pressurization to cause adiabatic expansion, the heating and pressurization are executed at a temperature T selected from a range of 300° C. to 374° C. and a pressure P, and the pressure P is equal to or higher than a saturated vapor pressure of water at the temperature T and equal to or lower than the saturated vapor pressure+50 atmospheres.

According to this method, the solubilization ratio of the entire soluble material can be increased to 35% or more.

Advantageous Effects of Invention

According to the present invention, there is provided a production method for a soluble material which can be executed without using a large-sized batch type apparatus and can perform sufficient sterilization, and in which the soluble material can be directly used as a soluble food material or the like for production of a food product.

BRIEF DESCRIPTION OF THE SEVERAL VIEWS OF THE DRAWING

FIG. 1 is a view schematically showing a phase diagram of water.

DESCRIPTION OF EMBODIMENTS

In a production method for a soluble material according to an embodiment, a solid raw material, which contains at least one component of a hydrolyzable material selected from the group consisting of a protein, a carbohydrate and a lipid, and a fibrous material, is used. Note that, only one kind of the raw material may be used or a plurality of kinds thereof may be used in combination. A non-solid material may be added as long as a solid material is contained as the raw material.

Herein, the terms "protein", "carbohydrate", "lipid", and "fibrous material" are defined according to the Standard Tables of Food Composition in Japan 2015 (Seventh Revised Version) Supplementary Edition in 2018. The carbohydrate is expressed as an available carbohydrate in the Standard Tables of Food Composition in Japan 2015 (Seventh Revised Version) Supplementary Edition in 2018. Furthermore, the fibrous material is expressed as a dietary fiber. The protein is hydrolyzed to produce a peptide and then produce an amino acid. The carbohydrate is hydrolyzed to produce oligosaccharide, disaccharide, monosaccharide, or the like. The lipid is hydrolyzed to produce glycerol and a fatty acid (saturated fatty acid, monovalent fatty acid, or polyvalent fatty acid).

The protein refers to a high-molecular-weight compound that is a dehydration condensate of an amino acid (for example, arginine, histidine, lysine, aspartic acid, glutamic acid, serine, threonine, asparagine, glutamine, cysteine, selenocysteine, glycine, proline, alanine, isoleucine, leucine, methionine, phenylalanine, tryptophan, tyrosine, or valine), and a material obtained by adding a compound to a protein, such as glycoprotein (for example, gliadin), is considered to be included in the protein. The protein may be composed of one or two or more kinds thereof, and examples of a protein composed of two or more kinds thereof include gluten (including glutenin and gliadin).

The dietary fiber can be classified broadly into a water-soluble dietary fiber and an insoluble dietary fiber, and the water-soluble dietary fiber is further divided into a low-molecular-weight water-soluble dietary fiber and a high-molecular-weight water-soluble dietary fiber. The water-soluble dietary fiber includes pectin, alginic acid, a gum substance, glucomannan, and the like, and the insoluble dietary fiber includes hemicellulose, lignin, chitin, cellulose, and the like.

The cellulose is classified broadly into a cellulose I type and a cellulose II type, and natural cellulose belongs to the I type. The cellulose I type has crystallinity, and is regarded to be divided into two types of crystalline systems of triclinic crystal $1\alpha$ and monoclinic crystal $I\beta$. At least a part of these crystals is amorphized by heating and pressurization in the present production method.

As the raw material containing at least one of a hydrolyzable material and a fibrous material, as described above, at least one of grain, tuber crops, and meats can be adopted. As the grain, at least one selected from soybean, adzuki bean, kidney bean, black bean, corn, sesame, buckwheat, *Panicum miliaceum, Setaria italica, Echinochloa esculenta*, wheat, and rice can be exemplified, and as the tuber crops, at least one selected from potato, sweet potato, and taro (such as *Colocasia esculenta*) can be exemplified. The meats are classified broadly into meat and seafood, and examples of the meat include chicken meat, pork, beef, mutton, brawn, and venison. Examples of the seafood include fish, shellfish, Cephalopoda, echinoderm, and crustacean.

According to the main table of the Standard Tables of Food Composition in Japan 2015 (Seventh Revised Version) Supplementary Edition in 2018, all of barley, wheat, rice, potato, adzuki bean, kidney bean, and soybean contain a protein, a carbohydrate (available carbohydrate), a lipid, and a dietary fiber. Furthermore, according to the same table, all of fish, beef, and chicken meat are regarded to contain a protein and a lipid. As described above, grain, tuber crops, and meats correspond to a raw material containing at least one component of a hydrolyzable material selected from the group consisting of a protein, a carbohydrate and a lipid, and a dietary fiber.

The raw material is not limited to a food material, and also includes a feed (such as livestock feed), and factory residues generated by processing of the food material and the feed. Note that, fish meal, rice bran, bones, resins, and the like are included in any of "food material, a feed, and a factory residue". A soluble material to be obtained may contain not only a material of a food product for human but also a feed, a supplement, or raw materials of these. In a case where the raw material is a bone and a resin, soluble materials to be obtained may be a bone meal and a resin constituent (such as a hydrolysate of a resin).

In a case where a food material is used as the raw material, those containing a fibrous material are particularly suitable. For example, grain and tuber crops are suitably used. Note that, when soybean or defatted soybean, and/or wheat is used as the raw material, a soluble material produced by executing the present invention can be suitably used for soy sauce production. When this soluble material is used, a soy sauce can be produced without requiring a steaming treatment.

The raw material is a solid form. The solid form described herein means that the raw material is not processed into a liquid form, a slurry form, or the like, and the raw material may have an aggregated form. Note that, it is considered that processing of merely adjusting a size by simply cutting according to a machine for a heating and pressurization treatment and processing of adding a powdery material to a solid raw material are not included in the above-described processing.

The heating and pressurization are performed in a state where the raw material and water in an amount corresponding to 0.04 to 2.4 parts by weight with respect to 1 part by weight of the dry amount of the raw material are caused to coexist. That is, it is characterized that 0.04 to 2.4 parts by weight of water with respect to 1 part by weight of the raw material is not added but water in the above range with respect to 1 part by weight of the "dry product" of the raw material is caused to coexist, that is, water is added such that the amount of the water together with water (for example, crystalline water) originally contained in the raw material reaches 0.04 to 2.4 parts by weight.

In a case where the raw material is a food material or a feed, the water content thereof is typically 1 to 25% by weight. In the case of using 100 g of the raw material having a water content of 10% by weight, the dry amount is 90 g, and when 35 g of water is added thereto, the total amount of water with respect to the dry amount of 90 g is 10+35=45 g, so that the amount of water to be caused to coexist with respect to 1 part by weight of the dry amount of the raw material is 45/90=0.5 parts by weight. Note that, in a case where the content of water contained in the raw material is extremely large, the state where "causing 0.04 to 2.4 parts by weight of water with respect to 1 part by weight of the dry amount to coexist" can be achieved with only the contained water even without additionally adding water.

The dry amount is a weight obtained by subtracting water (such as crystalline water) to be contained in the raw material as described in the above example. In a case where the amount of water to be contained is unclear, the amount of water can be measured by Karl Fischer's method or the like. Even in a case where the raw material is a mixture composed of a plurality of kinds of materials, the total dry amount is calculated, and the amount of water to be caused to coexist is determined on the basis of the calculated total dry amount.

Note that, when calculation is carried out in a case where the raw material is a protein (dry product), "water in an amount corresponding to 0.04 to 2.4 parts by weight with respect to 1 part by weight of a dry amount of the raw material" corresponds to the fact that water at a molar ratio of 0.24 to 14.6 times the theoretical amount of a hydrolyzable group exists. Herein, the theoretical amount of the hydrolyzable group is calculated by "protein weight g/average molecular weight of amino acid (110)". That is, in a case where the protein is 1 g, the theoretical value of the hydrolyzable group can be calculated to be 1/110 mol, and thus, if water (molecular weight 18) at a molar ratio of 1 time with respect to 1 mol of the hydrolyzable group is used, the amount of water is (1/110)×18=0.16 g.

A shearing force is applied to the raw material added with water in a state where heat at 200° C. or higher and a pressure of more than 1 atmosphere are applied. The heating temperature is preferably 200 to 374° C., further preferably 250 to 374° C., and particularly preferably 300 to 374° C. The pressurization is preferably equal to or higher than a saturated vapor pressure of water at the above-described temperature and 218 atmospheres or lower and is preferably 16 to 218 atmospheres.

FIG. 1 is a view schematically showing a phase diagram of water (see "Site of Ministry of Education, Culture, Sports, Science and Technology"). The point shown by T of FIG. 1 is a triple point of water, and corresponds to 0.001° C. and 611.7 Pa (0.0006 atmospheres). The point shown by C of FIG. 1 is a critical point of water and corresponds to 374° C., and the critical pressure corresponds to 22.1 MPa (218.3 atmospheres). Furthermore, a curve from T to C of FIG. 1 corresponds to a vapor-liquid coexistence curve (saturated vapor pressure curve).

In a preferred aspect, a condition under which a shearing force is applied to the solid raw material includes 200 to 374° C. and a pressure equal to or higher than a vapor-liquid coexistence curve of water. This condition corresponds to a hatched region in FIG. 1. That is, the condition is a region between a vertical dash line I (line at a temperature of 200° C.) and a vertical dash line II (line at a temperature of 374° C.), the region being equal to or higher than a curve from T to C (vapor-liquid coexistence curve). Note that, the pressure at the point A is 1.55 MPa (15.3 atmospheres). The condition under which a shearing force is applied to the solid raw material preferably incudes 200 to 374° C. and a pressure equal to or higher than a vapor-liquid coexistence curve of water and 268.3 atmospheres or lower (preferably 243.3 atmospheres or lower, and further 218.3 atmospheres or lower).

In a case where the temperature is 200° C. or higher, for example, since a sufficient calorific value is attained when the raw material treated by an extruder is subjected to adiabatic expansion, a stable soluble material can be obtained. When the temperature is lower than 200° C., vaporization heat is not sufficiently stolen at the time of adiabatic expansion, a stable soluble material is not obtainable, and drying is also insufficient. Even when the temperature is the lower limit of 200° C., hydrolyzation and/or amorphization occurs, but depending on the type and size of the raw material, a case where these changes merely occur in a part of the raw material is also assumed. In this regard, when the temperature is set to 250° C. or higher, the above-described changes can occur in a large percentage of the raw material, and when the temperature is set to 300° C. or higher, the above-described changes can occur in most of the raw material. Note that, 374° C. is a critical temperature of water, and thus this temperature is preferably regarded as an upper limit.

Note that, 16 atmospheres (1.62 MPa) is an atmosphere close to a numerical value on the vapor-liquid coexistence curve of water at 200° C., and 218 atmospheres (22.1 MPa) is an atmosphere corresponding to a numerical value on the vapor-liquid coexistence curve of water at 374° C.

A shearing force to be applied is not limited, and may be a value to be applied by rotation of a stirrer in a batch type apparatus (such as an autoclave or a pressure kettle). In the case of using an extruder that is a continuous apparatus, a shearing force in a range, which can be determined depending on a gap between a cylinder and a screw, a shape of grooves of the screw, a rotational speed of the screw, engagement of the screw (in the case of a twin screw, rotation of axes in the same direction, rotation of axes in different directions, or the like), a feed amount of the raw material, or the like, may be applied.

By the heating and pressurization described above, at least a part of the hydrolyzable material can be hydrolyzed and/or at least a part of the fibrous material can be amorphized, and the degrees of hydrolyzation and amorphization can be checked, for example, by test methods described in Examples regarding the soluble material after adiabatic expansion.

Regarding adiabatic expansion after the heating and pressurization, a batch type apparatus or a continuous apparatus (extruder) may be adjusted such that pressure can be rapidly released and the heating can be stopped, and it is preferable to open the pressurization and perform instantly cooling to 100° C. within 1 second. In the case of using the extruder, the above requirement is satisfied by ejection from a discharge port of the extruder.

A resultant product obtained by executing the production method is a soluble material. Herein, the soluble material refers to a resultant product, at least a part of which is dissolved in water in a case where water is added to have a solid content of 0.04 to 2.4% by mass. Note that, "dissolved in water" indicates that, when a liquid produced by adding water under the above conditions is filtered with a filter paper at normal temperature and normal pressure, a resultant product is contained in the liquid (filtrate) having passed through the filter paper, and the resultant product may not be completely dissolved in water, and may be, for example, in a partially dissolved state, a swollen state, or a dispersed state. The soluble material preferably has a solubilization ratio of about 10 to 95% in a case where water is added to have a solid content of 0.04 to 2.4% by mass.

Examples of the form of the soluble material include a swollen product, a granulated product, and a combination thereof. However, the form is not limited thereto. The raw material is expanded by adiabatic expansion after the heating and pressurization, and the form after production varies depending on components of the raw material. For example, in a case where the raw material contains a fibrous material, as a result of adiabatic expansion, a swollen product (porous soluble material) is generated, and in the case of a raw material not containing a fibrous material or containing a small content of a fibrous material, a granulated product is obtained. The soluble material can have, for example, a length (long diameter) of about 1 to 20 mm, and in the case of a swollen product, the density is preferably about 0.2 to 0.8 g/cm$^3$.

In a case where the soluble material is a granulated product, the soluble material can be easily dissolved in water or the like. On the other hand, even in a case where the soluble material is a swollen product, the soluble material is porous and has a large surface area, and thus dissolubility in water is excellent even when the soluble material has a certain degree of size (for example, an aggregated form). Furthermore, even when the soluble material is either a granulated product or a swollen product, handleability and processability are excellent when the soluble material is processed to produce another food material. Note that, a resultant product obtained by the above-described production method is a soluble material that is sterilized, and can be used as a soluble food material, a feed, or the like.

The soluble material is preferably obtained in a dry state. That is, a dry swollen product, a dry granulated product, or a combination thereof can be adopted. The "dry" described herein means a state where free water (generally means water in which molecules or particles in a raw material can freely move; one which microorganisms can use for proliferation is this free water) is not almost contained in the soluble material immediately after the production method is executed. By setting the soluble material in such a dry state, the effect that decomposition of the obtained soluble material does not occur is exhibited. From this viewpoint, the "dry" may mean that the obtained soluble material is not decomposed.

The heating and pressurization are suitably performed using an extruder. The extruder includes a cylinder including a supply port and a discharge port and capable of adjusting temperatures, a rotatable screw inserted into the cylinder, and a driving unit rotating the screw, a vent port may be provided to the cylinder, and a hopper may be connected to the supply port. The extruder is classified broadly into a uniaxial extruder having one screw and a biaxial extruder having two screws disposed to be engaged.

The biaxial extruder is further divided into a co-rotating biaxial extruder in which screws rotate in the same direction and a counter-rotating biaxial extruder in which screws rotate in different directions. Examples of the co-rotating biaxial extruder include a double-threaded screw type and a triple-threaded screw type, and examples of the counter-rotating biaxial extruder include a parallel axis type and an inclined axis type. Note that, the configuration of the extruder can be appropriately determined according to the type and amount of a raw material to be charged.

In the case of performing the heating and pressurization using an extruder, the time from start to end of the heating and pressurization (that is, until start of adiabatic expansion) is determined by the length of the extruder, the number of revolutions of the screw, the pitch of the screw, or the like. Since the heating and pressurization can be efficiently performed by an extruder, the time from start to end of the pressurization can be shortened, for example, to 1 to 60 seconds.

When the above-described production method is executed, since a high temperature is applied to the raw material, miscellaneous bacteria in the raw material can be sufficiently sterilized. The expression "sufficient sterilization" described herein indicates that miscellaneous bacteria to be eliminated are subjected to enhanced culture in a liquid culture medium, and then colonies of the miscellaneous bacteria are not recognized.

In the case of using soybean or defatted soybean, and/or wheat as the raw material, a dry swollen food material becomes a raw material of a soy sauce. That is, it is possible to provide a production method for a soy sauce, including a step of performing koji production with respect to a soluble material obtained by the above-described production method. When this production method is executed, a soy sauce with excellent taste and robust flavor can be obtained.

In this case, there are a method of separately forming raw materials into soluble materials and a method of mixing and treating raw materials to obtain a soluble material at once. As for the former method, the production method of the present invention is executed separately for soybean and wheat to obtain two kinds of soluble materials (may be in the form of dry swollen food materials), a seed koji is added to these two kinds of mixtures without performing a steaming step to obtain koji, and the koji is used in the production of a soy sauce. As for the latter method, the production method of the present invention is executed for a mixture of soybean or defatted soybean and wheat to obtain a soluble material (may be in the form of a dry swollen food material), a seed koji is added to the soluble material without performing a steaming step to obtain koji, and the koji is used in the production of a soy sauce.

The soy sauce may be any of koikuchi (dark-colored) soy sauce, usukuchi (light-colored) soy sauce, tamari (rich-tasting) soy sauce, saishikomi (refermented) soy sauce, and white soy sauce, and various production methods such as an authentically brewing method can be employed according to the type of the soy sauce.

As the production method for a soluble material, a production method for a soluble material by which a soluble material with an improved solubilization ratio can be produced, which will be described below, is included. That is, heating and pressurization are executed at a temperature T and a pressure P in the same manner as described above, except for conditions of heating and pressurization. Herein, the temperature T is selected from a range of 300 to 374° C., and the pressure P is in a range of $P_1$ atmospheres (a saturated vapor pressure of water at the temperature T) to ($P_1$+50) atmospheres.

The temperature T is selected from a range of, preferably 300 to 370° C. and more preferably 350 to 370° C. The pressure P can also be set to $P_1$ atmospheres to ($P_1$+40) atmospheres, $P_1$ atmospheres to ($P_1$+30) atmospheres, $P_1$ atmospheres to ($P_1$+20) atmospheres, $P_1$ atmospheres to ($P_1$+10) atmospheres, or $P_1$ atmospheres to ($P_1$+5) atmospheres. The pressure may be within the above range during execution of the production method and is not necessary a certain value at all times, and the value thereof may vary. Note that, the ranges of this temperature and this pressure are included in a state of subcritical water.

Specific numerical values of the temperature T and the pressure P are shown in the following Table 1 including preferable examples.

EXAMPLES

Hereinafter, the present invention will be described by means of Examples; however, the present invention is not limited to the following examples.

The solubilization ratio was evaluated by the following method.

[Solubilization Ratio of Soluble Material]

The amount of water of the soluble material was measured with a moisture meter. Based on this measured value, the soluble material was weighed so that the amount excluding the amount of water reached 5.0 g, this soluble material was caused to coexist with 50 g of water (This "50 g" includes the amount of water contained in the soluble material.), and the mixture was stirred and mixed with a mixer. The Brix value of the mixture was measured over time by PAL-1 manufactured by ATAGO CO., LTD., and the mixture in a state where this value was stabilized was used as a measurement sample for the solubilization ratio. This measurement sample was filtered to be divided into a filtered product (lees) and a filtrate (solution). Each of the filtered product and the filtrate was dried, the weight of the solid content generated from the filtered product was designated as "a" gram, the weight of the solid content generated from the filtrate was designated as "b" gram, and the solubilization ratio was determined by "b/5×100".

[Solubilization Ratio of Protein]

The mass percentage of the protein was measured according to 2-4 "Combustion method (modified Dumas method)" in Chapter 1 "General Components and Related Components" of the Standard Tables of Food Composition in Japan 2015 (Seventh Revised Version). The mass percentage of the protein was measured also from an untreated solid raw

TABLE 1

| Temperature (° C.) T | Lower limit $P_1$ (saturated vapor pressure) | Pressure (atm) | | | | | |
|---|---|---|---|---|---|---|---|
| | | Upper limit ($P_1$ + 50) | Preferable upper limit 1 ($P_1$ + 40) | Preferable upper limit 2 ($P_1$ + 30) | Preferable upper limit 3 ($P_1$ + 20) | Preferable upper limit 4 ($P_1$ + 10) | Preferable upper limit 5 ($P_1$ + 5) |
| 300 | 84.2 | 134.2 | 124.2 | 114.2 | 104.2 | 94.2 | 89.2 |
| 310 | 97.4 | 147.4 | 137.4 | 127.4 | 117.4 | 107.4 | 102.4 |
| 320 | 111.4 | 161.4 | 151.4 | 141.4 | 131.4 | 121.4 | 116.4 |
| 330 | 126.9 | 176.9 | 166.9 | 156.9 | 146.9 | 136.9 | 131.9 |
| 340 | 144.1 | 194.1 | 184.1 | 174.1 | 164.1 | 154.1 | 149.1 |
| 350 | 163.2 | 213.2 | 203.2 | 193.2 | 183.2 | 173.2 | 168.2 |
| 360 | 184.3 | 234.3 | 224.3 | 214.3 | 204.3 | 194.3 | 189.3 |
| 370 | 207.8 | 257.8 | 247.8 | 237.8 | 227.8 | 217.8 | 212.8 |
| 374 | 218.3 | 268.3 | 258.3 | 248.3 | 238.3 | 228.3 | 223.3 |

A soluble material with a high solubilization ratio can be produced by the above-described production method. Numerical values of the solubilization ratio vary depending on a case where the entire soluble material is targeted and a case where individual components (carbohydrate such as starch, and a protein) constituting the soluble material are respectively targeted, and the "high solubilization ratio" refers to 30% or more (preferably 40% or more, more preferably 60% or more) in terms of the entire soluble material, 75% or more (preferably 80% or more, more preferably 90% or more) in terms of the protein constituting the soluble material, or 75% or more (preferably 80% or more, more preferably 85% or more) in terms of the starch constituting the soluble material. The solubilization ratio can be measured by the method described in Examples.

material by the same method, and the solubilization ratio was calculated from this protein ratio.

In the "Combustion method (modified Dumas method)", a combustion method total nitrogen measuring apparatus is used as an analyzer. An appropriate amount of the sample was precisely weighed to a unit of 0.1 mg or less, and measurement is performed by a method suitable for the above-described apparatus. The nitrogen content (g/100 g) in the sample is calculated from a calibration curve obtained by measuring a standard product for creating a calibration curve, which has been precisely weighed to a unit of 0.1 mg or less in advance. The nitrogen amount (g/100 g) is determined by (A/1000×100)/W, and the protein content (g/100 g) is determined by the nitrogen amount (g/100 g)×(nitrogen-protein conversion factor). Herein, "A" means N (mg) detected from the calibration curve, and "W" means a sample collection amount (g).

[Solubilization Ratio of Starch]

The mass percentage of the starch in the soluble material was measured by an iodine colorimeter and coloration method. The mass percentage of the starch was measured also from an untreated solid raw material by the same method, and the solubilization ratio was calculated from this mass percentage ratio.

The iodine colorimeter and coloration method conforms to "Quantitative Determination of Amylose by Iodine Coloration and Colorimeter Method" (p. 120) described in Tatsuyuki Sugahara and Akio Maekawa (edited) (2000) "New Food Product Analysis Handbook" KENPAKUSHA (first version in Nov. 20, 2000). In this method, a spectrophotometer is used as an analyzer. The measurement was performed by the following procedures using a reagent containing ethanol, 10% sodium hydroxide, 6 mol/l hydrochloric acid, and an iodine solution (iodine 0.2%, potassium iodide 2.0%). That is, (1) 1 ml of ethanol and 10 ml of pure water are added to 100 mg of a defatted sample, the mixture is swollen, 2 ml of 10% sodium hydroxide is added thereto, and the mixture is left to stand in a refrigerator overnight and subjected to alkali gelatinization. (2) The mixture is neutralized with 6 mol/l hydrochloric acid to have a constant volume of 100 ml, 5 ml of the solution is collected in a 500 ml measuring flask, 5 ml of an iodine solution is added thereto, and a constant volume of 500 ml is obtained with pure water. (3) The absorbance at 660 nm is read. As a control solution, a solution added without a sample is prepared and used as blank. (4) The coloration degree of a mixture obtained by mixing amylose and amylopectin at an appropriate ratio and then is used as a calibration curve.

Example 1A

As the raw material, a mixture of defatted soybean/wheat=1/1 (kg/kg) was used. This raw material can be used as a soy sauce raw material. In order to hydrolyze and solubilize a protein, a lipid, and a carbohydrate in the raw material, a mixture obtained by further adding 10% by weight of water to the crystalline water content (10%) in the raw material was prepared. In the present example, 90 g per 100 g of the raw material is the dry amount, and 10 g per 100 g of the raw material is water contained in the raw material. Since water is added thereto in an amount of 10% by weight of the raw material, the amount of water to be added is 10 g with respect to 100 g of the raw material. In this way, 20 g of water with respect to 90 g of the dry amount (0.22 parts by weight of water with respect to 1 g of the dry amount) coexists.

Then, while the preparation raw material was continuously charged (charging rate: 120 kg/h) from a raw material charge port of a twin-screw extruder, the preparation raw material was delivered inside screws, mixed, heated (374° C., 218.3 atmospheres), compressed, and discharged in air immediately after 10 seconds of a retention time, thereby obtaining a soy sauce raw material (soluble material, water content: 5%) cooled instantaneously (within 1 second) to 100° C. or lower. The soluble material was obtained as a swollen product.

10 g of the obtained soy sauce raw material was collected, the soluble component in the soy sauce raw material was sufficiently eluted and washed in 1000 ml of hot water set at 30° C., and the residues (insoluble materials such as a carbohydrate and a fibrous material) were filtered and recovered, and then dried 105° C. with an infrared lamp to obtain insoluble residues. The protein in the residues was analyzed by the Kjeldahl method, the lipid in the residues was analyzed by an acid digestion method, and the carbohydrate (such as starch) in the residues was analyzed by a general method. As a result, it was found that at least a part of the hydrolyzable material of the protein, the lipid, and the carbohydrate (such as starch) was hydrolyzed to decrease the molecular weight. Furthermore, the lipid was also hydrolyzed to generate glycerin and saturated and unsaturated fatty acids.

On the other hand, the fibrous material in the recovered insoluble residues was amorphized, and enzymatic decomposition was performed at 30° C. in a slurry state added with a cellulase, so that the fibrous material was easily hydrolyzed to decrease the molecular weight, thereby generating soluble oligosaccharide. Note that, as Comparative Examples, even when a cellulase was added to the slurry of the raw material obtained by heating a preparation raw material before extruder heating at 120° C. for 20 minutes with an autoclave, the hydrolyzation of the crystalline fibrous material hardly occurred. As described above, the protein, the lipid, and the starchy matter in the heat-treated defatted soybean/wheat raw materials were hydrolyzed to decrease the molecular weight and were solubilized, and these had good quality as soy sauce production raw materials.

The solubilization ratio of the entire soluble material thus obtained and the solubilization ratios of the protein and the starch contained in the soluble material thus obtained were measured by the above-described method, and the results were shown in Table 2.

Example 1B

A soluble material was produced in the same manner as in Example 1A, except that the pressure was set to 268.3 atmospheres, thereby obtaining the same soluble material as that of Example 1A in the form of a swollen product.

Example 2A

A soluble material was produced in the same manner as in Example 1A, except that the temperature was set to 370° C. and the pressure was set to 207.8 atmospheres, thereby obtaining the soluble material in the form of a swollen product. The solubilization ratio of the entire soluble material thus obtained and the solubilization ratios of the protein and the starch contained in the soluble material thus obtained were measured by the above-described method, and the results were shown in Table 2.

Example 2B

A soluble material was produced in the same manner as in Example 2A, except that the pressure was set to 257.8 atmospheres, thereby obtaining the same soluble material as that of Example 2A in the form of a swollen product.

Example 3A

A soluble material was produced in the same manner as in Example 1A, except that the temperature was set to 350° C. and the pressure was set to 163.2 atmospheres, thereby obtaining the soluble material in the form of a swollen product. The solubilization ratio of the entire soluble material thus obtained and the solubilization ratios of the protein and the starch contained in the soluble material thus obtained were measured by the above-described method, and the results were shown in Table 2.

Example 3B

A soluble material was produced in the same manner as in Example 3A, except that the pressure was set to 213.2 atmospheres, thereby obtaining the same soluble material as that of Example 3A in the form of a swollen product.

Example 4A

A soluble material was produced in the same manner as in Example 1A, except that the temperature was set to 300° C. and the pressure was set to 84.2 atmospheres, thereby obtaining the soluble material in the form of a swollen product. The solubilization ratio of the entire soluble material thus obtained and the solubilization ratios of the protein and the starch contained in the soluble material thus obtained were measured by the above-described method, and the results were shown in Table 2.

Example 4B

A soluble material was produced in the same manner as in Example 4A, except that the pressure was set to 134.2 atmospheres, thereby obtaining the same soluble material as that of Example 4A in the form of a swollen product.

Example 5A

A soluble material was produced in the same manner as in Example 1A, except that the temperature was set to 250° C. and the pressure was set to 39.3 atmospheres, thereby obtaining the soluble material in the form of a swollen product. The solubilization ratio of the entire soluble material thus obtained and the solubilization ratios of the protein and the starch contained in the soluble material thus obtained were measured by the above-described method, and the results were shown in Table 2.

Example 5B

A soluble material was produced in the same manner as in Example 5A, except that the pressure was set to 89.3 atmospheres, thereby obtaining the same soluble material as that of Example 5A in the form of a swollen product.

Example 6A

A soluble material was produced in the same manner as in Example 1A, except that the temperature was set to 200° C. and the pressure was set to 15.3 atmospheres, thereby obtaining the soluble material in the form of a swollen product. The solubilization ratio of the entire soluble material thus obtained and the solubilization ratios of the protein and the starch contained in the soluble material thus obtained were measured by the above-described method, and the results were shown in Table 2.

Example 6B

A soluble material was produced in the same manner as in Example 6A, except that the pressure was set to 65.3 atmospheres, thereby obtaining the same soluble material as that of Example 6A in the form of a swollen product.

Comparative Example 1

A treated product was obtained in the same manner as in Example 1A, except that the temperature was set to 150° C. and the pressure was set to 4.7 atmospheres. The solubilization ratio of the treated product thus obtained and the solubilization ratios of the protein and the starch contained in the treated product thus obtained were measured by the above-described method, and the results were shown in Table 2.

Comparative Example 2

The treatment was tried to be performed in the same manner as in Example 1A while the temperature was set to 400° C. and the pressure was set to 218.3 atmospheres or more, but carbonization occurred.

[Stability Test]

It was found that, when the soy sauce raw materials obtained in Examples 1A and 1B were stored for 1 year at 25° C. and a relative humidity of 60% RH, the soy sauce raw materials are not changed and are excellent in storage stability.

TABLE 2

| | | Comparative Example 1 | Example 6A | Example 5A | Example 4A | Example 3A | Example 2A | Example 1A | Comparative Example 2 |
|---|---|---|---|---|---|---|---|---|---|
| Temperature | | 150 | 200 | 250 | 300 | 350 | 370 | 374 | 400 |
| Pressure | | 4.7 | 15.3 | 39.3 | 84.2 | 163.2 | 207.8 | 218.3 | — |
| Solubilization ratio (%) | Entire soluble material | 0 | 10 | 21 | 44 | 62 | 61 | 60 | Carbonization |
| | Protein | 0 | 10 | 36 | 88 | 93 | 95 | 95 | Carbonization |
| | Starch | 0 | 20 | 38 | 81 | 85 | 89 | 8 | Carbonization |

[Evaluation of Sterilization State]

The dry raw material continuously ejected (the soy sauce raw material as the soluble material obtained in Example 1A) was axenically collected by heating with an extruder, 5 g of the dry raw material was charged into a 500 ml flask containing 50 ml of sterilized water, and microorganisms were subjected to enhanced culture for 7 days in a shaking incubator at 30° C. Note that, as Comparative Examples, 5 g of a preparation raw material before heating with an extruder was charged into a 500 ml flask and subjected to a heating and sterilization treatment at 120° C. for 20 minutes with an autoclave, 50 ml of sterilized water was then added thereto, and shaking culture was performed at 30° C. for 7 days. Both the liquids cultured in this way each were applied in an amount of 1 ml to an agar plate medium for detection of general viable bacteria and cultured at 30° C. for 7 days, and the presence or absence of sterilization was determined by a method of detecting the number of colonies of microorganisms growing in the agar medium. As a result, it was confirmed that in the soy sauce raw material obtained in Example 1A, colonies of general viable bacteria were not detected, and sufficient sterilization was performed. On the other hand, in the raw material subjected to the sterilization treatment with an autoclave of Comparative Examples, $10^7$ or more general viable bacteria per 1 ml were detected after enhanced culture, and the raw material in a solid form was not sterilized by general autoclave heating.

A soluble material was produced as follows, by using a raw material other than defatted soybean/wheat.

Example 7

A soluble material was obtained with the amount of water with respect to 1 g of the dry amount and other conditions being set to be the same as those in Example 1A, except that 5 kg of brown rice was used instead of the mixture of defatted soybean/wheat=1/1 (kg/kg). The solubilization ratio of the entire soluble material thus obtained was measured by the above-described method, and as a result, the solubilization ratio was 97%.

Example 8

A soluble material was obtained with the amount of water with respect to 1 g of the dry amount and other conditions being set to be the same as those in Example 1A, except that 5 kg of corn was used instead of the mixture of defatted soybean/wheat=1/1 (kg/kg). The solubilization ratio of the entire soluble material thus obtained was measured by the above-described method, and as a result, the solubilization ratio was 98%.

Example 9

3 L of a solution obtained by dispersing seed koji bacteria for a soy sauce in sterilized water was uniformly added to 3 kg of the soluble material (soy sauce raw material) obtained in Example 1A, and culturing (koji production step) was performed for 3 days while ventilating air at 30° C., thereby obtaining koji. 3 L of salt water having a salt concentration of 26% was added thereto and mixed to obtain a charged liquid. The charged liquid was fermented at 30° C. for 1 month and subsequently aged by adding a yeast and *lactobacillus* to obtain moromi mash, and the moromi mash was subjected to pressing and clarifying filtration, thereby obtaining a raw soy sauce having 2.0% of high-concentration nitrogen.

This raw soy sauce was pasteurized (85° C., 30 minutes) so that a soy sauce excellent in delicious taste sensation, rich flavor, and aroma could be produced for a short period (3 months, usual aging period is 6 months) (Table 3). Note that, as the sterilization method of the raw material in general soy sauce production of Comparative Example 3, hydrated defatted soybean was sterilized in the steaming step (heated at 125° C. for 3 minutes by an autoclave) and wheat was sterilized in a roasting step (heated at 500° C. for 3 minutes in a roasting machine), the defatted soybean and the wheat each were heat-treated and then mixed, and then koji bacteria were cultured in the koji production step. In particular, since sterilization of thermophile and the like was not sufficient in the steaming step, general viable bacteria were also considerably proliferated in culturing of koji bacteria in the koji production step.

Note that, sensory evaluation of the obtained soy sauce was performed by a blind test with five panelists on the basis of relative evaluation with Comparative Examples.

The invention claimed is:

1. A production method for a soluble material, comprising:
   causing
      a solid raw material containing
         (i) at least one hydrolyzable material selected from the group consisting of a protein, a carbohydrate and a lipid, or
         (ii) a fibrous material, or
         (iii) a fibrous material and at least one hydrolyzable material selected from the group consisting of a protein, a carbohydrate and a lipid, and
      water in an amount corresponding to 0.04 to 2.4 parts by weight with respect to 1 part by weight of a dry amount of the solid raw material
   to coexist (so that an amount of the water including water originally contained in the solid raw material reaches 0.04 to 2.4 parts by weight);
   applying a shearing force in a state where heating and pressurization are performed at 250 to 374° C. and in a pressure range equal to or higher than a vapor-liquid coexistence curve of water to hydrolyze at least a part of the hydrolyzable material and/or to amorphize at least a part of the fibrous material; and
   halting the pressurization to cause adiabatic expansion.

2. The production method according to claim 1, wherein the pressurization is at 16 to 218 atmospheres.

3. The production method according to claim 1, wherein the heating and pressurization are performed inside an extruder, and the adiabatic expansion is executed by ejection from a discharge port of the extruder.

4. The production method according to claim 3, wherein the extruder is a biaxial extruder.

5. The production method according to claim 1, wherein the solid raw material comprises at least one selected from the group consisting of a food material, a feed, and a factory residue generated by processing of the food material and the feed.

6. The production method according to claim 1, wherein the solid raw material contains a fibrous material.

7. The production method according to claim 1, wherein the solid raw material comprises soybean, defatted soybean, or wheat, and the soluble material is for soy sauce production.

8. A production method for a soy sauce, comprising a step of performing koji production with respect to a soluble material obtainable by the production method according to claim 7.

9. The production method according to claim 1, wherein the water in an amount corresponding to 0.7 to 2.4 parts by weight with respect to 1 part by weight of a dry amount of the solid raw material.

TABLE 3

| Produced soy sauce | Nitrogen concentration (%) | Amount of amino acid produced (relative value) | Sensory evaluation | | |
|---|---|---|---|---|---|
| | | | Delicious taste sensation | Rich flavor | Aroma |
| Example 9 | 2.0 | 125 | Good | Good | Good |
| Comparative Example 3 | 1.6 | 100 | Standard | Standard | Standard |

10. The production method according to claim 1, wherein the solid raw material excludes wheat.

11. The production method according to claim 1, wherein the solid raw material excludes defatted soybean.

12. The production method according to claim 1, wherein the fibrous material comprises at least one selected from the group consisting of soybean, adzuki bean, kidney bean, black bean, corn, sesame, buckwheat, *Panicum miliaceum, Setaria italica, Echinochloa esculenta*, wheat, and rice.

13. The production method according to claim 1, wherein the fibrous material comprises corn.

14. The production method according to claim 1, wherein the fibrous material comprises brown rice.

15. The production method according to claim 1, wherein heating and pressurization are performed at 300 to 374° C.

16. The production method according to claim 1, wherein the pressurization is at 163.2 to 218 atmospheres.

17. The production method according to claim 1, wherein a pressurization time is 1 to 60 seconds.

18. The production method according to claim 1, wherein a solubilization ratio (%) of an entire soluble material is 60 wt % or more.

19. The production method according to claim 1, wherein a solubilization ratio (%) of a protein is 93 wt % or more.

\* \* \* \* \*